ced effective nozzle area for take-off. Upon further rearward axial displacement the shells adopt a reverse-thrust position to define air inlets to the fan when the fan blade pitch is reversed.

United States Patent [19]
Woodward

[11] 4,327,548
[45] May 4, 1982

[54] GAS TURBINE ENGINE POWER PLANT

[75] Inventor: Clifford S. Woodward, Bristol, England

[73] Assignee: Rolls-Royce Limited, London, England

[21] Appl. No.: 124,734

[22] Filed: Feb. 26, 1980

[30] Foreign Application Priority Data

Mar. 10, 1979 [GB] United Kingdom ............... 08504/79

[51] Int. Cl.³ .............................................. F02K 3/06
[52] U.S. Cl. .................... 60/226 A; 60/229; 60/232; 239/265.33
[58] Field of Search .............. 60/226 A, 229, 232; 239/265.33, 265.37, 265.35

[56] References Cited
U.S. PATENT DOCUMENTS

| 2,680,948 | 6/1954 | Greene | 239/265.37 |
| 2,840,984 | 7/1958 | Laucher | 239/265.33 |
| 3,820,719 | 6/1974 | Clark | 60/226 A |
| 4,132,068 | 1/1979 | Johnston | 60/226 A |

Primary Examiner—Douglas Hart
Attorney, Agent, or Firm—Stevens, Davis, Miller & Mosher

[57] ABSTRACT

A ducted fan propulsion plant has a reversible-pitch fan driven by a core gas turbine engine and housed in a duct which terminates at its downstream end in an outlet nozzle defined between two semi-cylindrical shells. The shells are mounted for movement hydraulically both axially and angularly to define an increased effective nozzle area for take-off. Upon further rearward axial displacement the shells adopt a reverse-thrust position to define air inlets to the fan when the fan blade pitch is reversed.

8 Claims, 5 Drawing Figures

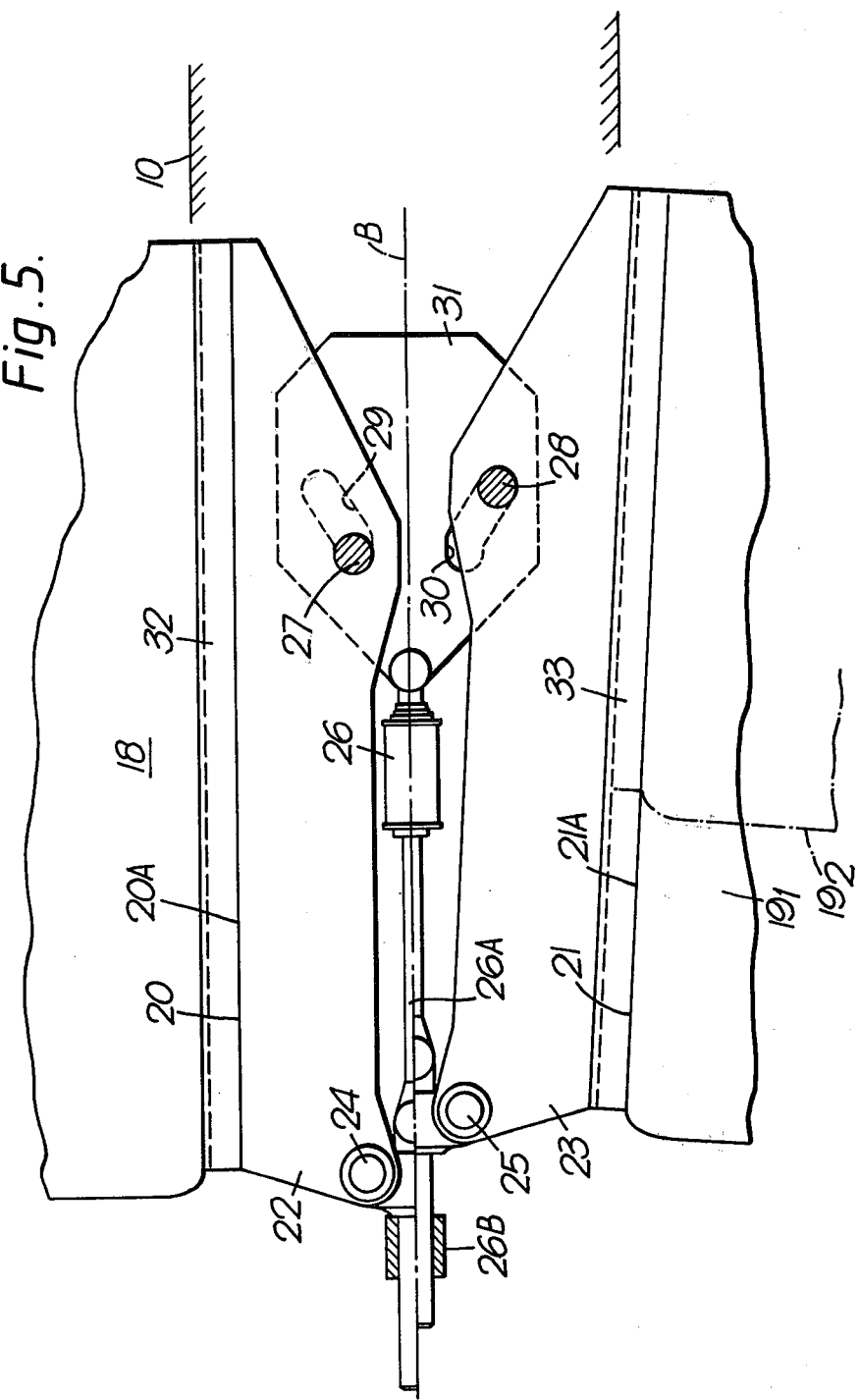

GAS TURBINE ENGINE POWER PLANT

DESCRIPTION

This invention relates to gas turbine engine powerplant for aircraft propulsion and in particular to a variable area exhaust nozzle for the propelling fluid in such powerplant.

It is known e.g. from our United Kingdom Pat. No. 735,122 for a said exhaust nozzle to comprise two half-round shells defining between them the flow passage of the nozzle and connected at their upstream ends to a fixed flow duct. The shells are connected to the duct for angular movement about a common axis extending through the flow axis of the nozzle perpendiculary thereto.

The shells each have a half-round transverse edge adjacent a downstream edge of the fixed duct and straight longitudinal edges at the respective arcuate ends of the shell. The flow area of the nozzle is enlargeable by pivoting the shells away from one another. This involves overlap between said adjacent edges of the shells and the fixed duct. As a result the adjacent regions of the shells and the duct are of substantial radial thickness which can be an aerodynamic disadvantage. Also there is discontinuity of the surfaces over which the flow of ambient air passes over the exterior of said regions which is also an aerodynamic disadvantage. These disadvantages are particularly acute if the half-shell construction of nozzle is applied to the bypass duct of a bypass engine where the duct and the nozzle are already of substantial radial thickness for reasons of mechanical strength.

It is also known to move a downstream portion of a said bypass duct axially away from a fixed upstream portion with a view to open an inlet for air to be driven through the bypass duct in a forward direction to provide a braking effect on the aircraft in which the powerplant is installed. In such a case it can be desirable to constitute the whole of the downstream portion as a variable area nozzle made in two half-round shells. However, in the above-described known nozzle construction the shells are pivotally connected to said duct, i.e. to said fixed upstream portion. This makes it impossible to move the nozzle away from the duct for said inlet purposes.

The invention claimed herein overcomes those difficulties. By pivoting the shells about respective axes at their peripheries, difficulties arising from said overlap are substantially avoided. Further, the invention does not necessarily require a pivotal connection between the duct and the shells. As a result the nozzle shells can be moved away from the duct for the purpose of providing said inlet without impairing the ability of pivoting the shells for the purpose of varying the flow area of the nozzle.

The invention will be further described, by way of example only, with reference to the accompanying purely diagrammatic drawings, in which:

FIG. 5 is an enlarged detail of FIG. 2 and shows an actuating mechanism for movement of the two cowl shells of the propulsion unit shown in FIGS. 1 to 4.

Figure 1:
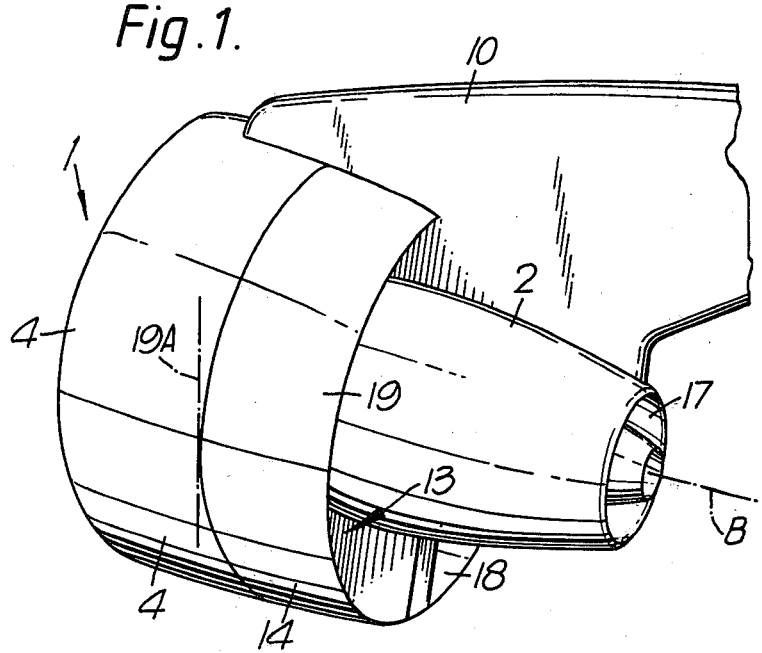
FIG. 1 is a perspective view of a ducted fan powerplant according to one embodiment of the invention, shown mounted on a supporting pylon of an aircraft.
Figure 2:
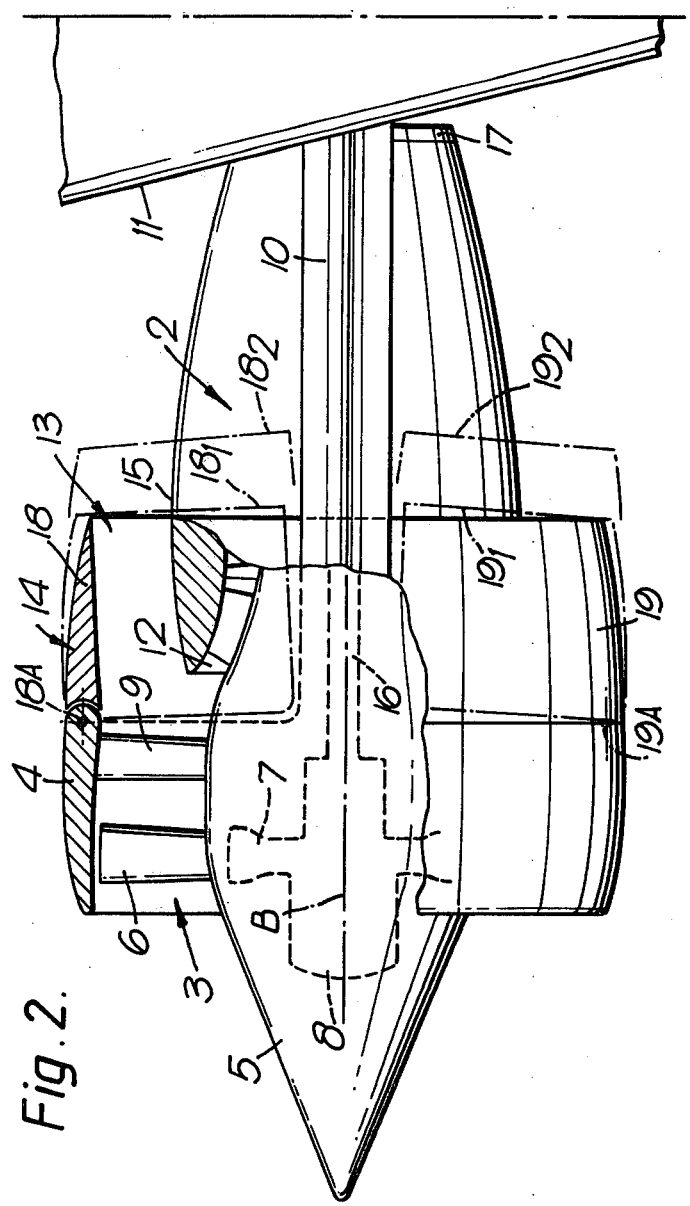
FIG. 2 is a partly cutaway plan view of the powerplant shown in FIG. 1.

Referring to FIGS. 1 and 2, the illustrated ducted fan powerplant 1 comprises a core gas turbine engine 2 which drives a propulsion fan 3 disposed upstream of andco-axial with the engine 2. The propulsion fan 3 is housed in a duct 4 which surrounds co-axially a centre body 5 disposed upstream of and co-axially with the core engine 2. The centre body 5 tapers to a point upstream of the fan 3 and defines with the duct 4 an air intake for the fan 3. The fan 3 has a bladed rotor comprising fan blades 6 which extend radially outwardly from the centre body 5 and which are anchored to a rotor assembly 7 housed within the centre body 5. The fan rotor assembly 7 includes a hydraulically controlled pitch-varying mechanism 8, indicated in broken outline in FIG. 2 of known construction. The pitch-varying mechanism 8 is operable to vary the pitch of the fan rotor blades 6 to match the fan to different engine operating conditions, and in addition the mechanism 8 is capable of reversing the pitch of the fan rotor blades 6 when the propulsion unit is to be operated with reverse thrust.

The fan duct 4 is rigidly connected to the centre body 5 by a row of stator blades 9 located downstream of the fan rotor blades 6. Both the fan duct 4 and the core engine 2 are supported by fixed structure of an aircraft, in this case a supporting pylon 10, part of which is shown, projecting downwardly and forwardly from an aircraft wing 11, part of which is shown diagrammatically in FIG. 2.

The core propulsion engine 2 has an annular air intake 12 co-axially surrounding the centre body 5 downstream of the stator blades 9. The annular air intake 12 receives air from the fan 3, the remainder of the air flow from which is directed through an annular fan outlet nozzle 13 defined between a cowl assembly 14 immediately downstream of the fan duct 4 and an outer casing 15 of the core engine 2. Thus, the duct 4 and the flow passage, commencing with the intake 12, through the engine 2 constitute parallel flow ducts for the fan and the engine respectively.

Downstream of the intake 12 the core engine has, in flow-series, a low and a high pressure compressor, a combustion chamber, and a high and a low pressure turbine connected to drive the respective compressor, all in accordance with known gas turbine practice and therefore not specifically shown. The exhaust from the turbines emerges from the engine through a nozle 17.

The low pressure turbine shaft has a forward shaft extension 16 to which the fan rotor assembly 7 is coupled, to be driven by the low pressure turbine of the engine. To extract the necessary power from the gas turbine exhaust the low pressure turbine would in this case have multiple stages, for example, four rotor stages, mounted on the low pressure turbine shaft.

The cowl asembly 14 is formed by two semi-cylindrical shells 18, 19 (FIG. 2) which are arranged symmetrically on opposite sides of the supporting pylon 10 and which in a normal cruise position, shown in FIGS. 1 and 2, form effectively a downstream continuation of the fan duct 4. The shell 18 has opposite longitudinal edges 20 disposed in a common plane 20A. The shell 19 has coresponding edge 21 in a plane 21A. The edges 20, 21 are parallel to each other in the cruise position of the shell (FIG. 2). FIG. 5 shows diagrammatically an opposite pair of longitudinal edges of the two cowl shells 18, 19, FIG. 5 being a composite view in which the upper half of the Figure shows the shell 19 in the cruise position while the lower half of the Figure shows the shell 18 in the take-off position. A mounting flange 22, 23 is attached to each opposing longitudinal edge 20, 21, the flanges 22, 23 projecting towards each other and being connected at their upstream ends by respective pins 24, 25 to a common actuator rod 26A which is displaceable longitudinally, that is, parallel to the axis of the propulsion unit, by means of an hydraulic jack 26. At their downstream ends the two mounting flanges 22, 23 have respective cam follower pins 27, 28 which project into respective cam slots 29, 30 in a fixed cam plate 31 mounted on the pylon between the shell 18, 19. The cam slots 29, 30 diverge in a downstream direction and are arranged so that when the actuator rod 26A is in its upstream position, as shown in the upper half of Figure 5, the respective cam follower pin 27 is at the upstream end of the associated cam slot. The rod 26A is slideable in a bearing 26B in said fixed structure. It will be appreciated that a similar actuator mechanism with associated camming is associated with mounting flanges on the opposite pair of opposed longitudinal edges of the semicylindrical cowl shells 18, 19.

Figure 3:
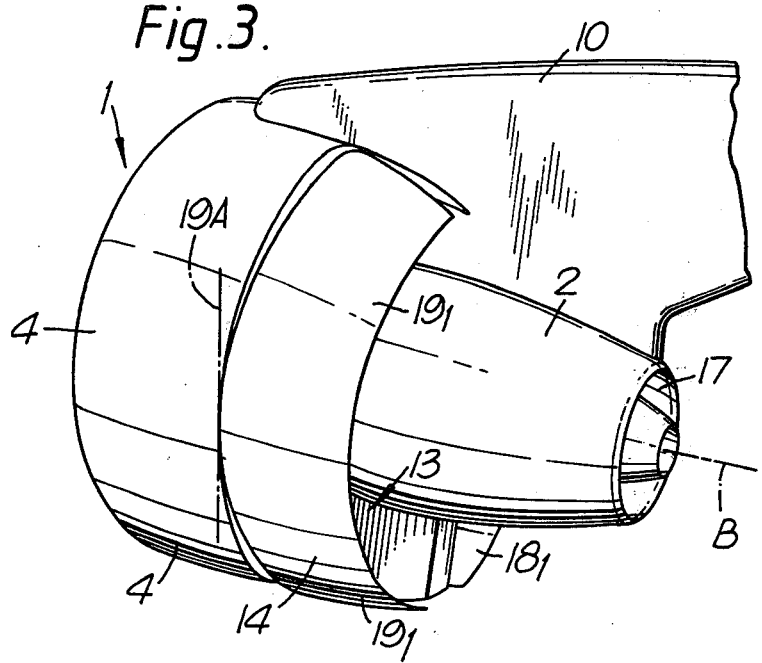
FIGS. 3 and 4 are perspective views similar to FIG. 1 illustrating the powerplant in the take-off and reverse thrust positions, respectively.

The actuator jack 26 has two operative positions, shown in the upper and lower halves respectively of FIG. 5, in which the respective cam follower pins 27, 28 are disposed respectively at the upstream and downstream ends of their associated cam slots 29, 30. When the actuator jack 26 is extended the respective pivot pins 24, 25 are displaced in an upstream direction, shown in the upper half of FIG. 5, and the two cowl shells 18, 19 are disposed with their opposing longitudinal edges 20, 21 parallel to each other. This is the cruise condition of the engine, with the cowl assembly 14 effectively a smooth continuation of the external surface of the fan duct 4. Also, in the latter position, the half-shells 18, 19 are held firmly against the adjacent, i.e. the downstream, edges of the duct 4 and then constitute a rigid structure therewith. In the retracted position of the actuator jack 26 the pivot pins 24, 25 are displaced in a downstream direction relative to their positions when the jack 26 is extended, as shown in the lower half of FIG. 5, in which the two pins 27, 28 are located at the downstream ends of the cam slots 29, 30, thereby holding the two cowl shells 18, 19 in positions shown in broken outline at $18_1$, $19_1$ in FIG. 2, and as illustrated in FIG. 3. In this position the two shells 18, 19 define an annular outlet nozzle of increased cross sectional area, typically 10% greater than the cross sectional area of the nozzle when the shells 18, 19 are in the cruise position.

The displacement of the two cowl shells 18, 19 in their downstream direction when they are moved angularly into their take-off position ensures that the shells, in moving angularly, do not interfere with the fixed structure of the fan duct.

Figure 4:
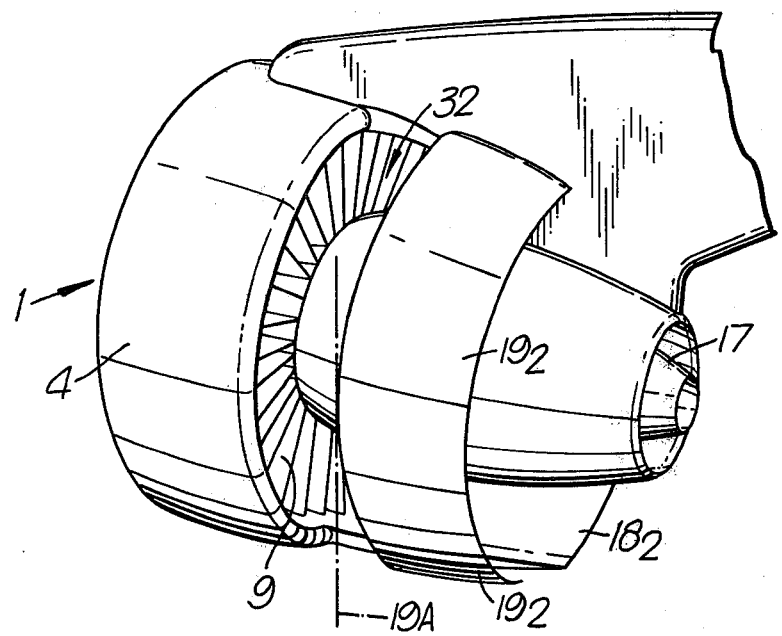

Further actuator means (not shown) are also provided for displacing the two cowl shells 18, 19 in a downstream direction when in their divergent take-off configuration to positions $18_2$, $19_2$ shown in broken outline in FIG. 2, and shown diagrammatically in FIG. 4. In these positions the two shells 18, 19 are spaced from the upstream portion of the fan duct cowl by semi-annular apertures 32, (FIG. 4) which serve as air intakes when the pitch of the fan blade 6 is reversed, reversing the direction of the resultant thrust exerted by the propulsion unit.

For the purpose of said displacing of the shells 18, 19, the edges 20, 21 maybe supported on the mounting flanges 20, 21 by tracks 32, 33 along which the shells 18, 19 are movable relative to the flanges 20, 21, hydraulic actuators, now shown, being provided between the shells 18, 19 and the flanges 20, 21 to effect the movement.

Although the shells 18, 19 are not physically connected at their peripheries to the duct 4, the movements of the pins 24, 25 and pins 27, 28 are effectively angular movements about axes 18A, 19A (FIG. 2) perpendicular to the main longitudinal axis, denoted B of the duct 4 and nozzle 14 and parallel to the planes 20A, 21A. In other words, the bearing 26B and the cam 29 support the edge 20 for a compound motion having a linear component through the bearing 26B and an angular component about the pin 24. Also, the pins 24, 27 support the shell at two locations spaced apart in the direction of the axis B and provide a safe support notwithstanding the fact that there is no physical pivot at the periphery of the shell. The same applies to the shell 19.

However, it is within the scope of the invention to provide pivot means (not illustrated) to actually connect the shells 18, 19 to the duct 14 at the axis 18A, 19A. In such a case the pin and cam means 27, 28, 29, 30 as well as the bearing 26B would be dispensed with and the jack 26 would be connected by two separate links to the pins 24 and 25 respectively. It will be clear that this construction would not be employed if the shell 18, 19 have to be moved rearwardly along the tracks 32, 33.

What is claimed is:

1. A gas turbine powerplant for aircraft propulsion comprising, a flow duct for propulsive fluid, an exhaust nozzle connected to the downstream end of said duct, a first axis being a common longitudinal axis of said duct and said nozzle, said nozzle comprising two substantially semi-cylindrical shells each having two longitudinal edges lying in a common plane, the longitudinal edges of the one shell confronting the corresponding edges of the other shell, fixed structure adjacent to said edges, guide means connecting said shells at said edges, at locations spaced apart therealong, to said fixed structure and cooperating to guide said shells for angular motion about respective second axes extending at the periphery of said shells tangentially thereto, and operating means for imparting said angular motion to said shells.

2. A powerplant according to claim 1, wherein said guide means includes an upstream guide means supporting said shells at the upstream ends thereof on said fixed structure for longitudinal motion, pivot means supporting said shells at the upstream ends thereof for angular motion about respective third axes extending adjacent said edges parallel to said second axes, and downstream guide means arranged at a location downstream of the upstream guide means and supporting said shells for angular motion about the third axes, the longitudinal motion and the angular location about the third axes combining to effect said angular motion about the second axes.

3. A powerplant according to claim 2, wherein said downstream guide means comprises cam surfaces extending in a plane perpendicular to said common plane, said surfaces being provided on one of said fixed structure and said shells, and follower elements engaged with said surfaces provided on the outer one of said fixed structure and said shells.

4. A powerplant according to claim 1 comprising two parallel flow ducts respectively for a gas turbine engine and for a fan driven by said engine, said shells being provided at the downstream end of said fan duct.

5. A powerplant according to claim 4, wherein said fan having blades of reversible pitch thereby to reverse the flow through the duct, and said shells being movable axially away from said duct to a position defining therewith a substantially annular gap constituting an intake for said reverse flow.

6. A powerplant according to claim 1, further comprising means connected between said fixed structure and each longitudinal edge of each shell for supporting the edge for a compound motion having a linear component in the direction of said longitudinal axis and an angular component about a third axis extending adjacent said edges parallel to said second axis, and means connected between the fixed structure and the respective longitudinal edges for moving the shells about said third axes.

7. A powerplant according to claim 6, further comprising a first support means supporting an upstream portion of each said longitudinal edge for linear movement in the direction of said longitudinal axis, a second support means supporting a downstream portion of each said longitudinal edge for movement substantially arcuately about the pivot axis of the respective shell, the first and second support means co-operating to support each shell for said compound motion.

8. A powerplant according to claim 6, wherein said first support means comprising a member supported on the fixed structure for movement in the direction of said longitudinal axis, further comprising a pivot means on said third axes connecting said upstream portion to said member, said second support means comprising a cam and follower means connecting said downstream portion to said fixed structure and guiding said downstream portion for movement substantially arcuately about said second axis.

* * * * *